US012611822B2

(12) United States Patent
Fromonteil

(10) Patent No.: US 12,611,822 B2
(45) Date of Patent: Apr. 28, 2026

(54) METHOD FOR MANUFACTURING A COMPOSITE PART REINFORCED WITH NANOTUBES

(71) Applicant: SAFRAN AIRCRAFT ENGINES, Paris (FR)

(72) Inventor: Didier Fromonteil, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 730 days.

(21) Appl. No.: 17/640,654

(22) PCT Filed: Sep. 2, 2020

(86) PCT No.: PCT/FR2020/051522
§ 371 (c)(1),
(2) Date: Sep. 15, 2022

(87) PCT Pub. No.: WO2021/048483
PCT Pub. Date: Mar. 18, 2021

(65) Prior Publication Data
US 2023/0219303 A1 Jul. 13, 2023

(30) Foreign Application Priority Data

Sep. 9, 2019 (FR) ...................................... 1909879

(51) Int. Cl.
*B29C 70/02* (2006.01)
*B29C 70/18* (2006.01)
(Continued)

(52) U.S. Cl.
CPC ............ *B29C 70/025* (2013.01); *B29C 70/18* (2013.01); *B29C 70/342* (2013.01); *B29C 70/50* (2013.01); *B29C 70/887* (2013.01); *F01D 5/282* (2013.01)

(58) Field of Classification Search
CPC ..... B29C 70/025; B29C 70/18; B29C 70/342; B29C 70/50; B29C 70/887; F01D 5/282
See application file for complete search history.

(56) References Cited

U.S. PATENT DOCUMENTS

2003/0037675 A1* 2/2003 Gillingham ............... D01F 6/92
55/528
2010/0170746 A1 7/2010 Restuccia et al.
(Continued)

FOREIGN PATENT DOCUMENTS

FR 2 732 406 A1 10/1996
FR 2 861 143 A1 4/2005
(Continued)

OTHER PUBLICATIONS

Association of the Nonwoven Fabrics Industry—What is Nonwoven Fabric—Apr. 21, 2018 (Year: 2018).*
(Continued)

*Primary Examiner* — Brian Christopher Delrue
(74) *Attorney, Agent, or Firm* — CUSHMAN PARTNERS, LLC

(57) ABSTRACT

A method for manufacturing a composite part reinforced with nanotubes, includes stacking a plurality of composite plies of prepreg and at least one composite ply integrating nanotubes, the at least one composite ply integrating nanotubes being positioned in an inter-ply space between two composite plies of prepreg, wherein the at least one composite ply integrating nanotubes is a ply having a thermoplastic component, the nanotubes being integrated in the thermoplastic component.

12 Claims, 2 Drawing Sheets

(51) Int. Cl.
B29C 70/34 (2006.01)
B29C 70/50 (2006.01)
B29C 70/88 (2006.01)
F01D 5/28 (2006.01)

(56) References Cited

U.S. PATENT DOCUMENTS

2015/0283788 A1* 10/2015 Tsotsis ................... B32B 5/022
156/60
2019/0153876 A1* 5/2019 Gemeinhardt ........... B32B 5/26

FOREIGN PATENT DOCUMENTS

FR 2 995 815 A1 3/2014
WO WO 2014/011293 A2 1/2014

OTHER PUBLICATIONS

Melt blown nanofibers Ellison et al.2007 (Year: 2007).*
Melting Point of PE—Mar. 15, 2019 (Year: 2019).*
Carbon nanotunes-doped veils—Latko et al—Aug. 3, 2015 (Year: 2015).*
International Search Report as issued in International Patent Application No. PCT/FR2020/051522, dated Dec. 7, 2020.
CR Communication under Article 94(3) CBE as issued in European Patent Application No. 20775917.6, dated Aug. 22, 2024.

* cited by examiner

[fig 1]
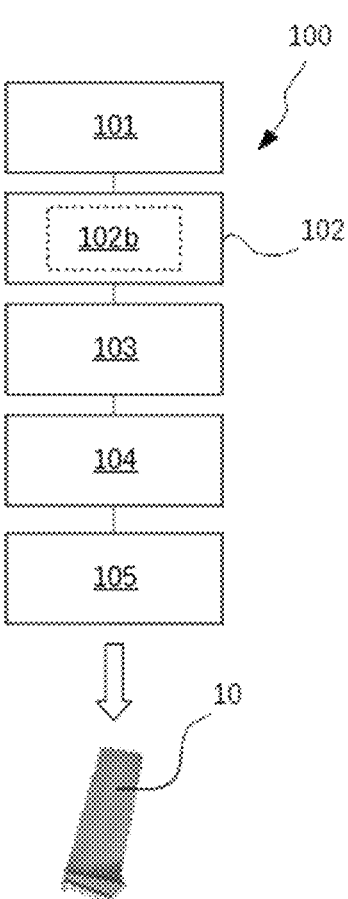
[fig 2]
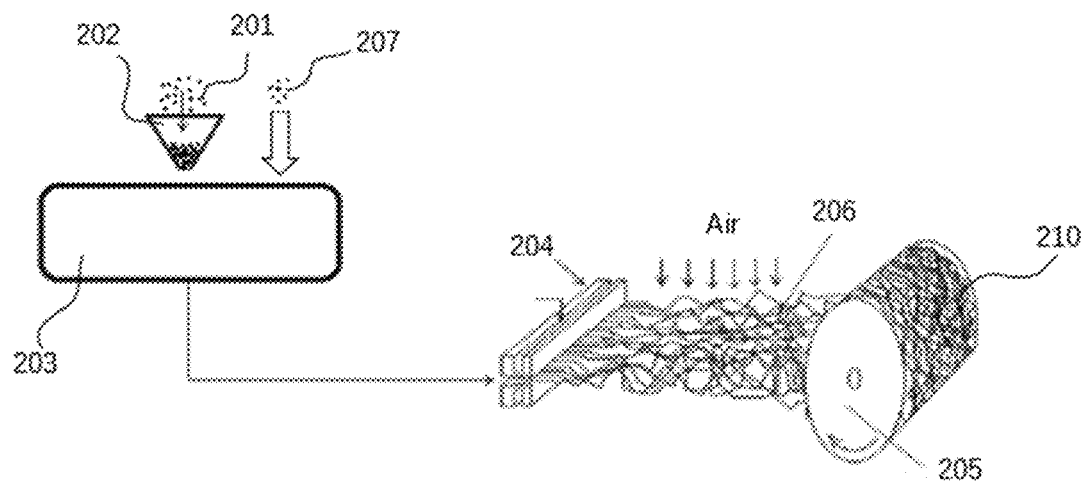

[fig 3]

METHOD FOR MANUFACTURING A COMPOSITE PART REINFORCED WITH NANOTUBES

CROSS-REFERENCE TO RELATED APPLICATIONS

This application is the U.S. National Stage of PCT/FR2020/051522, filed Sep. 2, 2020, which in turn claims priority to French patent application number 1909879 filed Sep. 9, 2019. The content of these applications are incorporated herein by reference in their entirety.

TECHNICAL FIELD OF THE INVENTION

The technical field of the invention is that of the manufacture of reinforced parts made of composite materials having improved impact resistance characteristics.

The invention has a particularly interesting application in the field of turbomachines, notably for the manufacture of parts made of composite materials subjected to shocks or impacts, such as for example fan blades or casings. TECHNOLOGICAL BACKGROUND OF THE INVENTION Conventionally, it is known that composite materials having several polymerised reinforcement layers have a certain weakness, under the effect of impacts, in the direction of the thickness. The different constituent reinforcement layers can then separate by delamination.

This weakness of composite materials is notably problematical in the field of turbomachines. Indeed, certain parts, notably fan blades made of composite materials, are more exposed to impacts and may be subjected to impacts of foreign bodies, such as for example a bird, hail or pebbles, potentially leading to a degradation of the structure of the composite part.

To reinforce the cohesion of the reinforcement layers of the composite part, techniques for weaving reinforcement fibres in three dimensions have been developed, notably described in the patent applications FR2732406 and FR2861143 filed by the Applicant.

However, this technique is relatively complex and costly to implement. Thus, for cost-effectiveness reasons, for certain parts made of composite materials of the turbomachine, which undergo fewer stresses, this implementation technology does not apply even though these parts can potentially be subjected to impacts, or shocks, risking causing for example delamination.

To reinforce the cohesion of the different reinforcement layers of a panel made of composite materials manufactured from different composite plies, and thus to improve the resistance of the panels to the phenomenon of delamination, a transversal seaming technique has been developed improving the cohesion of the different reinforcement layers of the composite material with carbon fibres by the insertion of carbon nanotubes between the plies during the stacking of the plies.

This technique consists more particularly in positioning a "forest" of vertical carbon nanotubes on a ply of non-polymerised composite and in inserting this ply of composite reinforced with nanotubes between two plies of prepreg carbon, until a stack of 16 plies of prepreg carbon is obtained.

However, this technique requires a complex implementation for growing nanotubes vertically on the whole of a substrate and for the precise positioning of the nanotubes on a ply of prepreg.

SUMMARY OF THE INVENTION

In this context, the invention proposes an alternative embodiment making it possible to simplify the production of a part made of composite material, for example a composite multi-ply panel, reinforced with nanotubes so as to reinforce the cohesion of the different composite layers during impacts.

To this end, the invention relates to a method for manufacturing a composite part reinforced with nanotubes, said method comprising a stacking step consisting in stacking a plurality of composite plies of prepreg and at least one composite ply integrating nanotubes, said at least one composite ply integrating nanotubes being positioned in an inter-ply space between two composite plies of prepreg, said method for manufacturing being characterised in that said at least one composite ply integrating nanotubes is a ply having a thermoplastic component, said nanotubes being integrated in said thermoplastic component.

Apart from the characteristics mentioned in the preceding paragraph, the method for manufacturing according to the invention may have one or more complementary characteristics among the following, considered individually or according to all technically possible combinations thereof:

said at least one composite ply integrating nanotubes has a thermoplastic matrix and/or thermoplastic fibres;

said at least one composite ply integrating nanotubes is a web of thermoplastic fibres, said nanotubes being integrated in said thermoplastic fibres;

said web of thermoplastic fibres is a web of non-woven thermoplastic fibres;

the web of thermoplastic fibres has a weight per unit area comprised between 15 g/m² and 100 g/m²;

said at least one composite ply integrating nanotubes integrates carbon nanotubes;

said stacking step consists in stacking a plurality of composite plies of prepreg and a plurality of composite plies integrating nanotubes, each inter-ply space between two composite plies of prepreg receiving a composite ply integrating nanotubes;

said method comprises a step of pressurising and placing under temperature conditions the stack of composite plies resulting from said stacking step;

said method comprises a step of manufacturing said composite ply integrating nanotubes, said step of manufacturing comprising a sub-step of mixing a thermoplastic polymer and nanotube powder;

said thermoplastic polymer is a polymer having a melting point comprised between 85° C. and 148° C.;

the thermoplastic polymer is a copolymer based on polycaprolactam and polyhexamethylene adipamide;

the mixture, resulting from said mixing sub-step, has a level of nanotube powder comprised between 1% and 10%, preferentially between 3% and 4%;

said step of manufacturing said composite ply integrating nanotubes comprises:

a sub-step of extruding said mixture resulting from said sub-mixing step through a die dimensioned to obtain filaments of thermoplastic polymer filled with nanotubes having a diameter comprised between 30 and 70 micrometres;

a sub-step of melting and blow forming said filaments of thermoplastic polymer filled with nanotubes.

The subject matter of the invention is also a composite part implemented by the method for manufacturing according to the invention characterised in that said composite part is a part for turbomachine.

The subject matter of the invention is also a turbomachine characterised in that it comprises a composite part implemented by the method for manufacturing according to the invention.

The invention and the different applications thereof will be better understood on reading the description that follows and by examining the figures that accompany it.

BRIEF DESCRIPTION OF THE FIGURES

The figures are only presented for indicative purposes and in no way limit the invention.

FIG. 1 illustrates a synoptic diagram illustrating the main steps of the method for manufacturing according to the invention.

FIG. 2 illustrates an overall view of the step of manufacturing a web of non-woven thermoplastic fibres reinforced with nanotubes during the second step of the method for manufacturing illustrated in FIG. 1.

FIG. 3 illustrates an exemplary stack of different prepregs and different non-woven webs of thermoplastic fibres reinforced by nanotubes produced during the third step of the method for manufacturing illustrated in FIG. 1.

Unless stated otherwise, a same element appearing in the different figures has a single reference.

DETAILED DESCRIPTION

[FIG. 1] illustrates a synoptic diagram illustrating the main steps of the method for manufacturing 100 according to the invention.

The method for manufacturing 100 according to the invention makes it possible to produce parts made of composite materials having improved characteristics concerning resistance to the phenomenon of delamination following, for example, an impact in the transversal direction of the part (i.e. perpendicularly to the direction of the reinforcement fibres.

The method for manufacturing 100 according to the invention is advantageously a method for manufacturing a composite part 10 for turbomachine. However, the method for manufacturing 100 according to the invention may also find other applications in other neighbouring technical fields, requiring the manufacture of composite parts having improved impact resistance, notably with a reduced manufacturing cost.

The method for manufacturing 100 according to the invention is more particularly a method for manufacturing a part made of composite material 10 produced from a plurality of plies of prepreg 220.

As a reminder, a prepreg is a semi-finished product constituted of a thermosetting resin (also called matrix) or a thermoplastic polymer (also called thermoplastic resin) impregnating a reinforcement constituted of fibres (woven or not). This composite is generally highly filled with reinforcement fibres and is intended to be hot moulded under pressure for the manufacture of a finished product which is generally constituted by the association of several plies of prepreg.

A first step 101 of the method for manufacturing 100 according to the invention consists in preparing a plurality of plies of prepreg 220 which will constitute the different structural layers of the final composite part 10.

The different plies of prepreg 220 are for example cut to the desired shape from a roll of prepreg when the conditioning of the prepreg is realised in rolls.

The prepreg is for example a prepreg based on woven carbon fibres and an epoxy matrix, or a PAEK (polyaryletherketone) matrix.

The choice of the reinforcement fibres, the matrix, the weaving and the orientation of the fibres is conventionally made as a function of the type of part to produce and the stresses undergone by said part.

A second step 102 of the method for manufacturing 100 according to the invention consists in preparing at least one composite ply 210 composed of a thermoplastic component integrating nanotubes.

The role of the composite ply 210 with thermoplastic component 10 integrating nanotubes is to realise an interface, or cohesion, reinforcement between two structural layers of the final composite part 10 produced by two plies of prepreg 220 described previously.

The composite ply "doped" with nanotubes is for example a ply having a thermoplastic matrix incorporating nanotubes.

The composite ply doped with nanotubes is for example a ply having thermoplastic fibres "doped" with nanotubes, i.e. that the ply incorporates nanotubes in the entanglement of the thermoplastic fibres.

The nanotubes are composed of one or more sheets of atoms wound on themselves in such a way as to form a tube. The nanotubes may be single-walled nanotubes (SWNTs) or multi-walled nanotubes (MWNTs).

When the nanotubes used are SWNTs, they have for example a diameter of the order of 2 nm and a length of the order of 5 μm.

When the nanotubes used are MWNTs, they have for example a diameter of the order of 10 nm and a length of the order of 2 μm.

As an example, the nanotubes used are carbon nanotubes. However, other known types of nanotube may be used as a replacement for the carbon nanotubes mentioned in the present invention.

According to an exemplary embodiment, the composite ply 210 integrating nanotubes is a web (also called felt or mat) of thermoplastic fibres, advantageously non-woven. The role of the ply of web of non-woven thermoplastic fibres is to realise an interface, or cohesion, reinforcement between two structural layers of the final composite part 10 produced by two plies of prepreg 220.

The ply of web of non-woven thermoplastic fibres is for example cut to the desired shape from a roll when the conditioning of the web of thermoplastic fibres is realised in rolls.

The ply of web of non-woven thermoplastic fibres makes it possible to simplify the method for manufacturing and the cost prices. However, it is also envisaged, in certain configurations, to use a ply of web of woven thermoplastic fibres.

This second step 102 may comprise, optionally, a sub-step 102a of manufacturing the composite ply integrating nanotubes, and more particularly the web of non-woven thermoplastic fibres.

The web of non-woven thermoplastic fibres is a particular type of material formed by the entanglement of thermoplastic fibres with each other without weaving. The maintaining of the thermoplastic fibres with each other is obtained by a thermal method of melting-blow forming making it possible to do without the use of a chemical binder.

The web of non-woven thermoplastic fibres of the invention is a web of thermoplastic fibres "doped" with nanotubes, i.e. that the web incorporates nanotubes in the entanglement of the thermoplastic fibres.

The web of non-woven thermoplastic fibres has for example a weight per unit area comprised between 15 g/m² and 100 g/m².

[FIG. 2] illustrates the principle of manufacturing a web of non-woven thermoplastic fibres, "doped" with nanotubes, used as binder to reinforce the delamination resistance of the different structural layers of the composite part.

Firstly, granules 201, or a powder, of thermoplastic polymer are introduced, via a feed hopper 202, into an extruder 203 having a worm screw for the production of the mixture, the extruder 203 comprising different heating zones to decrease the viscosity of the mixture along the worm screw.

Secondly, this mixture is filled with a nanotube powder 207. The mixture is advantageously filled with between 1% and 10% of nanotube powder 207 (for example carbon nanotube powder) so as to obtain a mixture having a viscosity suited for the passage of the heated mixture in a die 204. Preferentially, the mixture of thermoplastic polymer is filled with between 3% and 4% of carbon nanotube powder 207.

Thirdly, the worm screw kneads, compresses, shears, heats and transports, continuously, the mixture thus filled to the die 204.

Fourthly, the mixture filled with nanotubes passes through the die 204 having a grid shape with relatively thin openings so as to form filaments of thermoplastic polymer filled with nanotubes of several tens of millimetres diameter, for example between 30 and 70 μm.

Fifthly, by an operation of melting and blow forming, the different thermoplastic filaments filled with nanotubes are entangled and bound to each other.

Sixthly, the entangled and thermally bound filaments 206 are wound around a rotating mandrel 205 so as to form a web of non-woven thermoplastic fibres filled with nanotubes 210.

The thermoplastic polymer used for the production of the web of non-woven thermoplastic fibres filled with nanotubes 210 is a polymer with low melting point ranging from 85° C. to 148° C., the melting point temperature of the thermoplastic polymer being chosen as a function of the prepreg matrix used for the production of the composite part. As an example, the thermoplastic polymer may be a co-polyamide PA 6.6/6, based on polycaprolactam (polyamide 6 (PA 6)) and polyhexamethylene adipamide (polyamide 6.6 (PA 6.6)), having a melting point of the order of 106° C.

A third step 103 of the method for manufacturing 100 according to the invention consists in stacking, in a shaping tool, a plurality of plies of prepreg 220 with at least one composite ply integrating nanotubes 210, for example the web of non-woven thermoplastic fibres, said at least one composite ply integrating nanotubes 210 being positioned in an inter-ply space 221 between two plies of prepreg 220.

According to an alternative embodiment, the stack may comprise several composite plies integrating nanotubes 210 between two plies of prepreg 220.

Figure 3:
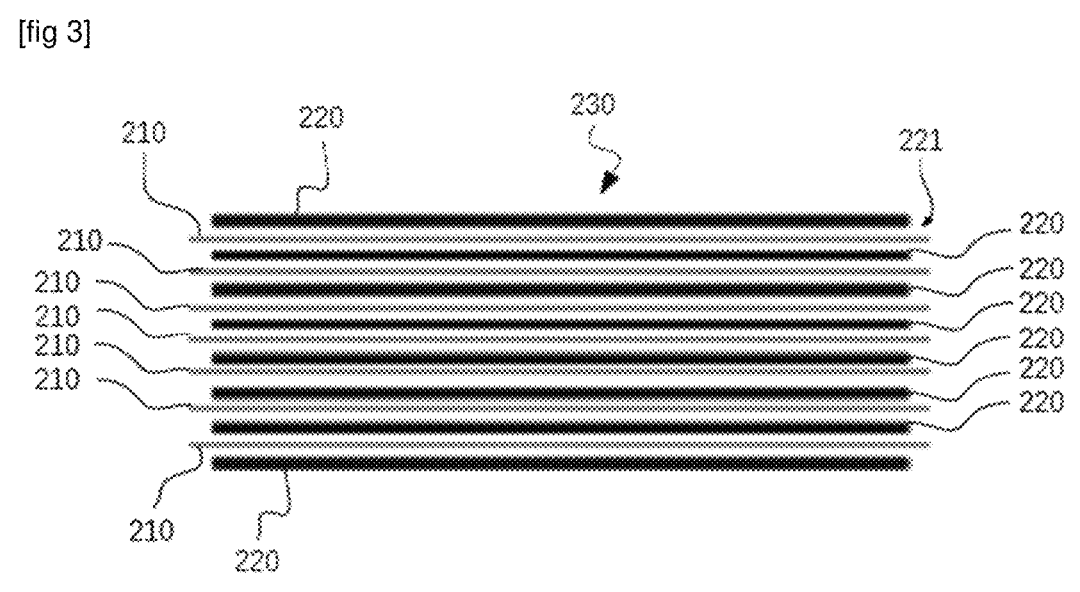

[FIG. 3] illustrates to this end a stack 230 of a plurality of plies of prepreg 220 and a plurality of composite plies integrating nanotubes 210, a composite ply integrating nanotubes 210 being positioned between two plies of prepreg 220.

According to an alternative embodiment, it is possible to position the most composites integrating nanotubes 210 uniquely in a specific region of the stack 230, for example at the centre of the stack, in an upper zone of the stack 230, in a lower zone of the stack 230 or instead in a lower zone and an upper zone of the stack 230.

Advantageously, the composite plies integrating nanotubes 210 will be placed, at least, in a region situated opposite (in the direction of the thickness) the potential impact zone.

In order to increase the density of the nanotubes between two plies of prepreg 200, it is possible to position several composite plies integrating nanotubes in a superimposed manner in a same inter-ply space 221, with different weights per unit area, compositions and/or weavings.

A fourth step 104 of the method for manufacturing 100 according to the invention consists in placing the stack 230 under vacuum and under pressure and in temperature conditions in an autoclave so as to produce the final composite part 10. The curing parameters are conventionally the parameters used for the production of a composite part from prepregs.

During the pressurisation and heating of the stack 230, the thermoplastic polymer of the thermoplastic composite plies integrating the nanotubes 210 melts and the nanotubes come directly into contact with the surrounding resin of the plies of prepreg. Under the conditions of temperature and pressure, the nanotubes bind to the surrounding matrix and create physical reinforcement bonds between the different composite layers of the stack 230, thus improving the cohesion of the different layers.

A fifth step 105 of the method for manufacturing 100 according to the invention consists in demoulding the final composite part 10 from the shaping tool.

Thanks to the method for manufacturing 100 according to the invention and to the use of a ply of composite filled with nanotubes, such as for example a web of non-woven thermoplastic fibres filled with nanotubes, the distribution of the nanotubes, their inclination with respect to the plies of prepreg is random which makes it possible to guarantee good integration and good cohesion between the different composite layers of the final part whatever the orientation and whatever the type of impact undergone by the final composite part 10.

The invention thus makes it possible to reinforce efficiently, and in a simple and rapid manner, the interface of plies of prepreg by the addition of a composite ply of thermoplastic fibres filled with nanotubes, for example carbon, the manufacturing process of which is simple and controlled.

The invention claimed is:

1. A method for manufacturing a composite part reinforced with nanotubes, said method comprising a stacking step that includes stacking a plurality of composite plies of prepreg and at least one composite ply integrating nanotubes, said at least one composite ply integrating nanotubes being positioned in an inter-ply space between two composite plies of prepreg, wherein said at least one composite ply integrating nanotubes is a ply having a thermoplastic component, said nanotubes being integrated in said thermoplastic component, the method including a step of manufacturing said composite ply integrating nanotubes that comprises:

a sub-step of extruding a mixture resulting from a mixing sub-step through a die dimensioned to obtain filaments of thermoplastic polymer filled with nanotubes;

a sub-step of melting and blow forming said filaments of thermoplastic polymer filled with nanotubes and without using a chemical binder, said at least one composite ply integrating nanotubes integrates multiwalled carbon nanotubes and is a web of thermoplastic fibres, said nanotubes being integrated in said thermoplastic fibres and the web of thermoplastic fibres has a weight per unit area comprised between 15 g/m² and 100 g/m².

2. The method for manufacturing a composite part reinforced with nanotubes according to claim 1, wherein said at least one composite ply integrating nanotubes has a thermoplastic matrix and/or thermoplastic fibres.

3. The method for manufacturing a composite part reinforced with nanotubes according to claim 1, wherein said web of thermoplastic fibres is a web of non-woven thermoplastic fibres.

4. The method for manufacturing a composite part reinforced with nanotubes according to claim 1, wherein said stacking step includes stacking a plurality of composite plies of prepreg and a plurality of composite plies integrating nanotubes, each inter-ply space between two composite plies of prepreg receiving a composite ply integrating nanotubes.

5. The method for manufacturing a composite part reinforced with nanotubes according to claim 1, wherein said method comprises a step of pressurising and placing under temperature conditions the stack of composite plies resulting from said stacking step.

6. The method for manufacturing a composite part reinforced with nanotubes according to claim 1, wherein said method comprises a step of manufacturing said composite ply integrating nanotubes, said step of manufacturing comprising a sub-step of mixing a thermoplastic polymer and nanotube powder.

7. The method for manufacturing a composite part reinforced with nanotubes according to claim 6, wherein the thermoplastic polymer is a polymer having a melting point comprised between 85° C. and 148° C.

8. The method for manufacturing a composite part reinforced with nanotubes according to claim 6, wherein the thermoplastic polymer is a copolymer based on polycaprolactam and polyhexamethylene adipamide.

9. The method for manufacturing a composite part reinforced with nanotubes according to claim 6, wherein the mixture resulting from said mixing sub-step has a level of nanotube powder comprised between 1% and 10%.

10. The method for manufacturing a composite part reinforced with nanotubes according to claim 1, wherein the filaments of thermoplastic polymer filled with the nanotubes have a diameter comprised between 30 and 70 micrometres.

11. A composite part implemented by the method for manufacturing according to claim 1, wherein said composite part is a part for turbomachine.

12. A turbomachine comprising a composite part implemented by the method for manufacturing according to claim 1.

* * * * *